United States Patent
Cardno

(10) Patent No.: US 9,418,120 B2
(45) Date of Patent: Aug. 16, 2016

(54) METHOD AND SYSTEM FOR OPTIMIZING THE ARRANGEMENT OF SPATIAL ELEMENTS

(75) Inventor: Andrew John Cardno, San Diego, CA (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 946 days.

(21) Appl. No.: 13/516,136

(22) PCT Filed: Dec. 14, 2010

(86) PCT No.: PCT/NZ2010/000252
§ 371 (c)(1),
(2), (4) Date: Dec. 26, 2012

(87) PCT Pub. No.: WO2011/078698
PCT Pub. Date: Jun. 30, 2011

(65) Prior Publication Data
US 2013/0144910 A1    Jun. 6, 2013

Related U.S. Application Data

(60) Provisional application No. 61/286,029, filed on Dec. 14, 2009.

(51) Int. Cl.
*G06F 17/30* (2006.01)
*G06Q 30/02* (2012.01)

(52) U.S. Cl.
CPC .... *G06F 17/30542* (2013.01); *G06F 17/30572* (2013.01); *G06Q 30/02* (2013.01)

(58) Field of Classification Search
CPC ............... G06F 17/30572; G06F 17/30542; G06Q 30/02
USPC .................................................. 707/780, 805
See application file for complete search history.

(56) References Cited

U.S. PATENT DOCUMENTS

| | | | |
|---|---|---|---|
| 6,405,195 B1 * | 6/2002 | Ahlberg | G06F 17/30398 707/954 |
| 6,711,577 B1 | 3/2004 | Wong | |
| 7,716,226 B2 * | 5/2010 | Barney | G06F 17/30675 707/748 |

(Continued)

FOREIGN PATENT DOCUMENTS

EP    1 376 397    1/2004

OTHER PUBLICATIONS

International Search Report for International Application No. PCT/NZ2010/000252 mailed Apr. 21, 2011.

(Continued)

*Primary Examiner* — Shahid Alam
(74) *Attorney, Agent, or Firm* — Merchant & Gould P.C.

(57) ABSTRACT

In a data visualization system, a method of analysing and representing spatial data sets to optimize the arrangement of spatial elements, the method including the steps of: retrieving data from a data storage module that is in communication with the data visualization system, determining lift values for a plurality of predefined spatial areas from the retrieved data based on a set of fuzzy association rules applied to the predefined spatial areas, determining spatial performance values for the predefined spatial areas, and calculating a weighted spatial relationship between the determined lift values and spatial performance values.

10 Claims, 4 Drawing Sheets

(56) References Cited

U.S. PATENT DOCUMENTS 8,185,563 B2 * 5/2012 Cohen ............................ 707/805
8,429,174 B2 * 4/2013 Ramani ............. G06F 17/30259
  345/419

OTHER PUBLICATIONS

"Data Mining and Data Visualization' SOM 485." Department of Systems and Operations Mgmnt. CA State Univ. Northridge. 2007. http://www.csun.edu/~hcmgt004/DMandVis.ppt.

Laube et al. "Spatial support and spatial confidence for spatial associations rules." *Headway in Spatial Data Handling—Lecture Notes in Geoinformation and Cartography Series*. 2008. pp. 575-593.

Lewin et al. "Let's Talk Turkey: Applying Retail Market Basket Analysis to Gaming." *Casino Enterprise Mgmnt*. vol. 6. I. 12. 2008. pp. 10-14.

Lewin et al. "Market Basket Analysis Part II: Recovering Mr. Benedict's Money." *Casino Enterprise Mgmnt*. vol. 7. I. 1. 2009. pp. 16-18.

Lewin et al. "Market Basket Analysis Part III: Using Demographics and Spatial Information." *Casino Enterprise Mgmnt*. vol. 7. I. 2. 2009. pp. 10-15.

Singh et al. "Gaming Interactions that Drive Profits, Pt. I: Fuzzy Spatial Association and Gravity Modeling." *Casino Enterprise Mgmnt*. vol. 7. I. 12. 2009. pp. 16-20.

Singh et al. "Market Basket Analysis, Part VI: The Quartal Graph is Worth Several Thousand Words." *Casino Enterprise Mgmnt*. vol. 7. I. 6. 2009. pp. 28-31.

Singh et al. "Turning Market Basket Analysis into Action." *Casino Enterprise Mgmnt*. vol. 7. I. 5. 2009. pp. 20-31.

Zadeh. "Fuzzy Sets." *Information and Control*. vol. 8. 1965. pp. 338-353.

\* cited by examiner

|  | HIGH LIFT | | | | LOW LIFT | | | |
|---|---|---|---|---|---|---|---|---|
|  |  | X |  |  |  |  |  | X |
| ABOVE |  |  |  |  |  | X | X |  |
| EXPECTED |  | X | X |  |  |  | X |  |
|  |  |  |  |  |  |  |  |  |
|  | X |  |  |  |  |  |  |  |
| BELOW |  |  |  |  |  | X |  |  |
| EXPECTED |  |  | X |  |  |  |  |  |
|  |  | X |  |  |  |  |  | X |

FIGURE 4

METHOD AND SYSTEM FOR OPTIMIZING THE ARRANGEMENT OF SPATIAL ELEMENTS

This application is a National Stage Application of PCT/NZ2010/000252, filed 14 Dec. 2010, which claims benefit of U.S. Provisional Ser. No. 61/286,029, filed 14 Dec. 2009 and which applications are incorporated herein by reference. To the extent appropriate, a claim of priority is made to each of the above disclosed applications.

FIELD OF THE INVENTION

The present invention relates to a method and system for optimizing the arrangement of spatial elements.

BACKGROUND

Market basket analysis is used to determine relationships between different transaction items based on analysing which transaction items are usually combined together. It is known to produce individual rules that can be constructed to determine relationships. These relationships may also extend to the inclusion of spatial relationships that take into account the relative spatial separation or closeness of the transaction items.

An object of the present invention is to provide an improved method and system for representing spatial association rules.

A further object of the present invention is to provide an improved method and system for applying spatial association rules in conjunction with a spatial performance model in order to optimize a spatial solution.

Each object is to be read disjunctively with the object of at least providing the public with a useful choice.

The present invention aims to overcome, or at least alleviate, some or all of the afore-mentioned problems.

SUMMARY OF THE INVENTION

The present invention provides a system and method that optimizes the spatial arrangement of elements.

According to one aspect, the present invention provides, in a data visualization system, a method of analysing and representing spatial data sets to optimize spatial layouts, the method including the steps of: retrieving data from a data storage module that is in communication with the data visualization system, determining lift values for a plurality of predefined spatial areas from the retrieved data based on a set of fuzzy association rules applied to the predefined spatial areas, determining spatial performance values for the predefined spatial areas, calculating a weighted spatial relationship between the determined lift values and spatial performance values.

Preferably the fuzzy association rules apply spatial data within the retrieved data to a set of association rules to determine lift values for the predefined spatial areas.

Preferably, the method includes the steps of monitoring the retrieved data over time and predicting changes to the weighted spatial relationships based on changes in the retrieved data.

Preferably, the method includes the steps of applying a genetic algorithm to the retrieved data to form a spatial design, and subsequently performing the determination and calculation steps.

Preferably, the method includes the steps of determining isolated spatial areas and calculating weighted spatial relationships within the isolated spatial area.

According to a further aspect, the present invention provides a data visualization system that is arranged to perform the herein described methods.

BRIEF DESCRIPTION OF THE DRAWINGS

Embodiments of the present invention will now be described, by way of example only, with reference to the accompanying drawings, in which:

FIG. 4 shows a table displaying the results of a method according to an embodiment of the present invention.

DETAILED DESCRIPTION OF THE INVENTION

First Embodiment

Figure 1:
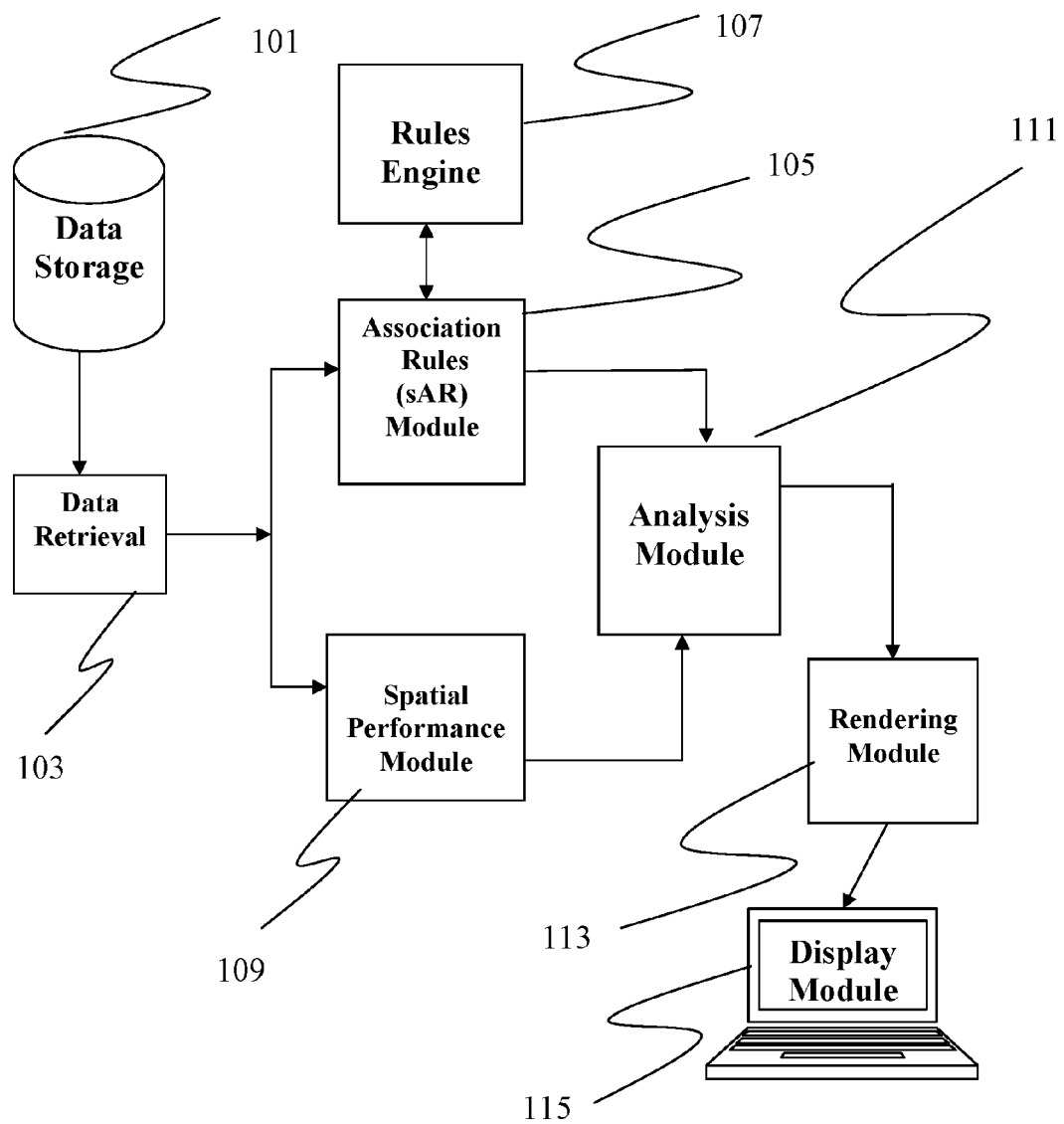
FIG. 1 shows a conceptual system block diagram according to an embodiment of the present invention.

Embodiments of the present invention are provided herein to describe how the use of market basket analysis may be extended to data sets including a vast amount of numerical data, such as that produced by the many interactions between gaming devices, for example.

Embodiments of the present invention are described herein with reference to a system adapted or arranged to perform a method of applying spatial association rules in conjunction with a spatial performance model in order to optimize a spatial solution.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines used to implement the methods described may be adapted accordingly depending on system and user requirements so that various functions may be performed by different modules or engines to those described herein, and that certain modules or engines may be combined into single modules or engines.

It will be understood that the modules and/or engines used to implement the methods described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

Although the herein described embodiments are directed towards applying the methodology to gaming data obtained from a gaming system, it will be understood that these methods may be applied to other scenarios and systems.

The methods described herein may be implemented using a general purpose computing system specifically programmed to perform the described steps. Alternatively, the methods described herein may be implemented using a specific computer system such as a data visualization computer, a database query computer, a graphical analysis computer, a retail environment analysis computer, a gaming data analysis computer, a manufacturing data analysis computer, a business intelligence computer etc., where the computer has been specifically adapted to perform the described steps on specific data captured from an environment associated with a particular field.

For example, the data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

According to this embodiment, as shown in FIG. 1, the data is retrieved from a data storage module 101 by a data retrieval module 103. The data retrieval module 103 provides this data to the various other engines and modules of the system to enable the various methodologies to be performed.

This embodiment is directed towards analyzing gaming data for the purpose of gaming floor analysis in a casino environment. In particular, the description describes methods utilized by various modules and engines for creating fuzzy spatial association rules and gravity modeling. It will be understood that other analytical building blocks (modules and engines for example) may be used to decode the interactions; these may include, for example, visual representation modules, experimental design modules, mini casino management modules and social network analysis modules.

Although a vast amount of data is readily available from a gaming environment for analysis, it is usually not put to good use where the analysis of the data leads to successful planning and the maximization of profits due to gaming asset arrangement.

By including other non spatial drivers to the data sets being analyzed, for example measuring the lift values from a marketing campaign, steps are made in the right direction to lead to successful planning.

The next step utilizes a spatial association rules (sAR) module 105 in conjunction with an association rules engine 107 to build models that can be used to drive yield to specific areas of the gaming floor at specific times of day. That is, by looking at association rules based on both time of use of gaming assets and the location of the gaming assets in the gaming environment, further insight is obtained.

The rules developed and implemented by the spatial association rules (sAR) module and association rules engine offer a way of disentangling the vast dynamics of the gaming floor into a series of statistically associated patterns. The output of the analysis then enables a user to use the associations to rearrange the gaming floor and possibly push activity to areas of interest.

Further, the data from the retrieval module is communicated to a spatial performance module 109. The spatial performance module determines values associated with various spatial elements inside a defined space. For example, an average of a specific value may be determined for all elements within a defined space.

The output of the spatial performance module and spatial association rules (sAR) module is communicated to an analysis module 111, which determines the relationship between the two outputs. That is, the analysis module determines how the spatial performance values for the spatial elements and the relationship values for those spatial elements are related to each other.

The output from the analysis module is provided to a rendering module 113 which in turn provides a rendered output to an output module 115 in the form of a graphical representation showing the associations between the different elements (e.g. gaming assets and associated transactions) being analyzed. The output module in this embodiment is a display module.

As an alternative to, or in conjunction with, the display module, further output modules may be provided to output the association results. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the output data to be interfaced with other data handling modules or storage devices. As a further alternative, the output module may be the same or different data storage module as described herein.

Spatial association rules (sAR) are association rules that involve a spatial variable (see P. Laube, M. de Berg, M. van Kreveld (2008). Headway in Spatial Data Handling (Eds. Anne Ruas, Christopher Gold), Lecture Notes in Geoinformation and Cartography Series, pp. 575-593) and result in a lift measurement.

A lift measurement is a statistical measurement defined as follows:

$$\text{Lift}(A \to C) = P(A \cap C)/P(A)P(C)$$

Lift (A→C)=probability that A and C occur together, divided by the same probability assuming A and C to be independent.

The most common spatial variable is distance. In terms of a gaming environment, the association rules establish the effective lift that one game has on another taking into account the distance between the gaming assets. That is, the effective lift identifies whether one game is having an effect on another game's performance. In other words, the market baskets are weighted by the effect of distance, so that gaming assets that are spatially distant have less of an influence. This approach of using a weighted score is implemented by a fuzzy sAR module which provides as an output a fuzzy measurement of the association effect.

The following describes how the Fuzzy Association is defined.

In market basket analysis (MBA), spatial data requires additional processing. Consider the hypothesis that on a casino floor games that are close to an entrance get more business than those further away. The quality of the association rules produced by MBA is evaluated in terms of its support and confidence values. The support value of an association rule in the case of binary variables (a binary value is a yes or no value, e.g. did someone play a certain slot game or not?) is defined as the probability that someone buys one product with another (e.g., a customer takes a hotel room and plays on a particular table game). The confidence value is the conditional probability, if someone buys one product, then they buy the other product (see Bart Lewin, A. K. Singh, Andrew Cardno. Let's Talk Turkey: Applying Retail Market Basket Analysis to Gaming. Casino Enterprise Management, December 2008).

Because the number of possible distances from an entrance is unlimited, calculating these values for MBA requires the use of a threshold and a cut-off point to obtain meaningful support and confidence values.

This threshold requirement also arises in other situations; the term 'high coin in' also requires a cut-off point. There is some literature available on the use of fuzzy logic describing this type of calculation (see L. Zadeh, (1965). Fuzzy sets, Information Control Vol pp. 338-353), where a continuous variable (e.g., coin in) is mapped to a score-in the range [0,1]. Once distances have been converted to their corresponding scores, the spatial (locations) support and confidence values can be calculated by the fuzzy sAR module as follows.

$$\text{Spatial support}(A \to C) = \frac{\sum_x score_A(x) \times score_C(x)}{n}$$

$$\text{Spatial confidence}(A \to C) = \frac{\sum_x score_A(x) \times score_C(x)}{\sum_x score_A(x)}$$

Table 1 shows a simulated example of Spatial Market Basket Analysis calculations in which weekly coin-in (CI) values for 20 slot games on a casino floor along with distances of the slot games from the closest entrance (D1) and exit (D2) are given. In this example, two spatial association rules (sAR) are being compared:

sAR1: If A1 then C (notation: A1→C)
sAR2: If A2 then C (notation: A2→C)
where the antecedents of the two sAR's (A1 and A2) are:
A1=slot game is close to an entrance, A2=slot game is close to an exit
and the common consequent of the two rules is:
C=slot game has high weekly coin-in.
Sp=Spatial support value. Sc=Spatial confidence value.

TABLE 1

Simulated example showing calculations of Spatial Support and Spatial Confidence of the two rules A1 →C and A2 →C

| D1 | CI | Sc(D1) | Sc(CI) | Sp(A1→C) | D2 | Sc(D2) | Sp(A2→C) |
|---|---|---|---|---|---|---|---|
| 6 | 75168 | 1 | 0.93 | 0.93 | 1 | 0.5 | 0.47 |
| 6 | 75722 | 1 | 1 | 1 | 1 | 0.5 | 0.5 |
| 6 | 73807 | 1 | 0.76 | 0.76 | 1 | 0.5 | 0.38 |
| 6 | 74755 | 1 | 0.88 | 0.88 | 1 | 0.5 | 0.44 |
| 7 | 72183 | 0.8 | 0.56 | 0.45 | 0 | 1 | 0.56 |
| 7 | 72620 | 0.8 | 0.61 | 0.49 | 0 | 1 | 0.61 |
| 7 | 72325 | 0.8 | 0.58 | 0.46 | 0 | 1 | 0.58 |
| 7 | 71671 | 0.8 | 0.49 | 0.4 | 0 | 1 | 0.49 |
| 7 | 75574 | 0.8 | 0.98 | 0.79 | 0 | 1 | 0.98 |
| 7 | 74075 | 0.8 | 0.79 | 0.64 | 0 | 1 | 0.79 |
| 7 | 72602 | 0.8 | 0.61 | 0.49 | 0 | 1 | 0.61 |
| 7 | 72348 | 0.8 | 0.58 | 0.46 | 0 | 1 | 0.58 |
| 6 | 73694 | 1 | 0.75 | 0.75 | 1 | 0.5 | 0.37 |
| 6 | 73575 | 1 | 0.73 | 0.73 | 1 | 0.5 | 0.37 |
| 6 | 74207 | 1 | 0.81 | 0.81 | 1 | 0.5 | 0.41 |
| 6 | 73868 | 1 | 0.77 | 0.77 | 1 | 0.5 | 0.38 |
| 11 | 68988 | 0 | 0.16 | 0 | 2 | 0 | 0 |
| 11 | 68462 | 0 | 0.09 | 0 | 2 | 0 | 0 |
| 11 | 69014 | 0 | 0.16 | 0 | 2 | 0 | 0 |
| 11 | 68411 | 0 | 0.09 | 0 | 2 | 0 | 0 |
| Sum | | | 14.4 | 10.81 | | 12 | 8.52 |
| SAR | | | Confidence | | | | |
| (A1 →C) | | | 0.75 | | | | |
| (A2 →C) | | | 0.71 | | | | |

According to a further example, the support and confidence values for buildings being in close proximity to a lake and being above a particular price threshold are determined as follows:

P(Close)=3/7, P(Expensive)=4/7,

P(Close∩Expensive)=3/7

Support(Close⇒Expensive)=
P(Close∩Expensive)=3/7=0.43

Confidence(Close⇒Expensive)=P
(Close∩Expensive)/P(Close)=(3/7)/(3/7)=1

Therefore, the lift value may be calculated as follows:

Lift(Close⇒Expensive)=P(Close∩Expensive)/
[P(Close)×P(Expensive)]=(3/7)/[(3/7)×(4/7)]=1.75

The effect of the fuzzy spatial association may be considered for two slot machines. Lift values may be derived from confidence values (such as those shown in the above table). The first slot machine with a high lift (H) value from surrounding games the second slot machine with a low lift (L) value. It is likely that a machine with the high lift value is played at the same time as the surrounding games while the machine with the low lift value is played at different times, which results in a reverse kind of dependence.

This can be taken to another level by enabling the spatial performance module 109 to calculate the expected game performance of each location. One effective way of calculating the game performance is to build a weighted ranking of the performance of each location. In order to do this a method of generating the "average" performance of an area is implemented by the spatial performance module. This average performance is the summation of the effect of all surrounding games where games that are further away have less effect on the performance location ranking. In order to do this, inverse distance weighted (see Edward H. Isaaks, R. Mohan Srivastava (1989). Applied Geostatistics, Oxford University Press) performance location or gravity modeling is implemented by the spatial performance module.

Figure 2:
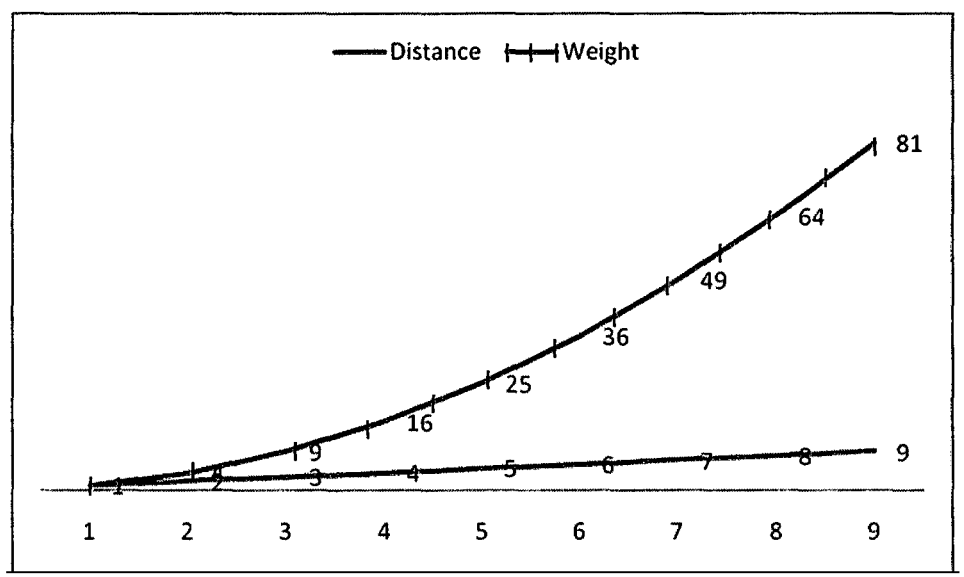
FIG. 2 shows a graph illustrating a rule where as distance is doubled the weight is increased by four times according to an embodiment of the present invention.

For example, the calculation could be based on the rule that as the distance is doubled the weight increases by four times. FIG. 2 is an illustration of a graph which shows the effect of this calculation. As referred to at http://en.wikipedia.org/wiki/Inverse-square_law, this "inverse-square law generally applies when some force, energy, or other conserved quantity is radiated outward radially from a source. Since the surface area of a sphere (which is $4\pi r^2$) is proportional to the square of the radius, as the emitted radiation gets farther from the source, it must spread out over an area that is proportional to the square of the distance from the source". This effect when applied to the "emanation" of performance from a location can be very effectively used to calculate the impact of one location on another.

It will be understood that other suitable weighting rules may be applied as an alternative.

The next step performed is by the spatial performance module 109 which determines the spatial performance values by calculating the sum of the rank multiplied by the location weight, where the sum of the weights is one (so each weight is the percentage of the total weight). In a geographic sense this calculation follows a model called Shepard's Method:

"The simplest form of inverse distance weighted interpolation is sometimes called "Shepard's method" (Shepard 1968). The equation used is as follows:

$$F(x, y) = \sum_{i=1}^{n} w_i f_i$$

where n is the number of scatter points in the set, $f_i$ are the prescribed function values at the scatter points (e.g. the data set values), and $w_i$ are the weight functions assigned to each scatter point. The classical form of the weight function is:

$$w_i = \frac{h_i^{-p}}{\sum_{j=1}^{n} h_j^{-p}}$$

where p is an arbitrary positive value"; in the case of gravity modeling p=2.

Using the spatial performance module to calculate this value for each gaming machine on the gaming floor results in an average value for each location where it is the weighted sum of the effect of surrounding locations.

Note: This calculation results in one calculation for the number of gaming devices squared. So if a gaming floor with 2000 games is being analyzed four million calculations will be needed to complete the interaction analysis.

By combining the gravity model (i.e. calculating the spatial performance values) and fuzzy spatial association rules (i.e. calculating the lift values) methods within the analysis module 111, a very interesting breakout of the games on the gaming floor into four interesting categories (average performance games are not considered interesting) as illustrated by the following table is provided.

|  | High Lift | Low Lift |
| --- | --- | --- |
| Above Expected | Leaders | Loners |
| Below Expected | Laggards | Losers |

The spatial performance values and lift values are cross-tabulated to produce the output, which is a weighted spatial relationship of the lift values and spatial performance values. Although the above table shows four quadrants, it will be understood that these four quadrants are defining the four general types associated with elements as calculated by the above described method.

The resultant table of cross-tabulated lift and spatial performance values may consist of more than four sections. That is, the resultant table may have a plurality of columns and a plurality of rows with each cross section of a column and row relating to a specific lift range or value and a specific spatial performance range or value.

Each of the elements being monitored by the system may be entered in a specific location within the table to indicate whereabouts it fits in with other elements in relation to their lift and spatial performance values. The relative location of each of the elements enables a user to determine important properties of those elements.

This simple breakout of games is a powerful first step in the data exploration process. The following section describes the four categories of gaming device that result from this combination of the ocean of interactions.

The games termed "Leaders" are outperforming the surrounding games and lift the surrounding games. These games may be the leaders in the area. They are often star performers and players may be drawn to these games and then flow onto play other games in the same area. Leaders are great candidates for further building the characteristics of a specific area of the gaming floor. They are natural candidates for further market basket analysis as they can be used as a draw card for other games that players who like the Leaders show a preference for.

The games termed "Loners" are beacons of performance that are drawing play but not lifting the games in the immediate area. Consider actions such as adding more of the same game or running market basket analysis to find other products that players who play this game like to flow onto. Comparison of the demographics of the players "Loner" game to its neighbors will give insight into why players in the area are not mixing.

The following describes an example from a real gaming floor. In this real world gaming floor optimization there was a salt and pepper arrangement of two games in a bank of slot machines (Alternating themes). Both of these themes were giving similar theoretical win numbers but on further analysis the players were found to be not mixing products. Analysis into the demographics of the two games showed that the two groups of players were of quite different demographic profiles. The very profitable response to this insight was the creation of two areas of gaming, one for players who preferred "salt" themes and one for players who preferred "pepper" themes. The results were stronger play for both games, the cost was a move of an existing product and a simple communication to the two customer groups informing them where their games were now located.

The laggards are games that have a positive lift effect on the games around them but are given play that is less than the surrounding games. The linkage these games have with their surroundings indicates we should treat them with care; one approach is to apply a "Why We Buy" (see Why We Buy, Puco Underhill 2000) survey to gain some understanding of the way players are playing these games; questions such as "are we oversupplied with this product in this area", or "Is the game priced correctly" should be considered in the first round of follow up analyses.

Games termed "Losers" are the games that have a negative effect on the surrounding areas and are under performing. This kind of game is a great candidate for removal, but one should not jump to conclusions, Sometimes further analysis using a market basket approach can show clusters of these games that have quite isolated players.

If the players are isolated to a particular product then it might be better to setup a separate playing area focused on this small group. In one real world example it was found that a group of Keno machines that were low performers had low (in fact near zero) lift on the surrounding games. However customer surveys showed the players were extremely loyal to this product. Instead of removing the product one of the most isolated and underperforming areas was turned into a specialist Keno room, this accompanied by a marketing program inviting these players to their special area was successful; moreover, the space that was made available became one of the highest performing space on the floor.

Often times the gaming floor can be seen as a mass of bright lights and colors, applying these techniques introduces an analytical framework that can change the way you see a gaming floor. In today's world of often diminishing returns, adapting the floor to give customers what they want where they want is rapidly becoming a science. The challenge lies in that there are ever more products and increasing flexibility, and vastly increasing volumes of data collected from the gaming floor. Operators can either exploit the data and learn to utilize our new found flexibility, or choose to rely on luck.

The optimization methods described herein may be implemented for use with a geospatial slowly changing dimension manager that handles the changing of spatially located data over time. This geospatial dimension manager utilizes in-database spatial database management techniques. A database is stored in the memory of the system, such as within the data storage module, for example. The data may be rendered and displayed to show the spatial arrangement of the elements associated with the data.

For example, the data may be associated with gaming assets, and the position of those gaming assets within a gaming environment may be represented graphically. Where those gaming assets are located on several floors, different layers may be used to indicate the floor on which the asset is located. Vectors may be used to visually represent the asset and the data being represented.

It will be understood that the spatial data may relate to elements other than gaming assets. For example, the data may relate to a manufacturing environment, retail store, logistical system, telecommunications network etc, wherein the elements may relate to manufacturing elements, retail elements, logistics elements, telecommunications elements.

The dimension manager may be used to analyse how changes in the spatial arrangement of the elements in the spatial area can affect performance over time. Various techniques may be implemented using the dimension manager. For example, neural networks, such as back propagation networks may be used. Further, classification type methods or regression analysis may be performed. These methods enable the behavior of the environment and the elements therein to be predicted by the system.

According to a further example, a genetic algorithm module may be used to implement a genetic algorithm to build one or more designs. That is, a design that defines a space or layout of various elements may be produced by a genetic algorithm. Subsequently, the association rules may be applied in order to forecast the performance of a design, or combinations of designs. That is, the genetic algorithm may be used to define a spatial relationship between various elements in a spatial area. Upon completion of the genetic algorithm, the spatial association rules may be applied to determine how the defined arrangement performs over time. This enables the system to provide a user with useful detailed predictions for new designs prior to implementing the designs in a real life environment.

It will be understood that the models described above may be implemented generally over a large space (layout) or may be directed to smaller defined areas. For example, the system may be used to monitor the spatial area to determine if there are any isolated areas. That is, an isolated area is where measured interactions are isolated to that particular area and do not cross over into other areas. For example, in a gaming environment, an isolated area may be a poker environment in which customers only attend poker tables, machines and tournaments without visiting other areas of the gaming environment. The monitoring of users using recognition techniques enables the system to determine whether there is any cross over. Recognition techniques include physical recognition techniques (e.g. face, voice, gait etc), transactional recognition techniques (e.g. bank accounts, loyalty cards etc) or any other form of recognition technique.

Once the system has determined the isolated area, the optimization models discussed herein may be applied to those separate areas.

Figure 3:
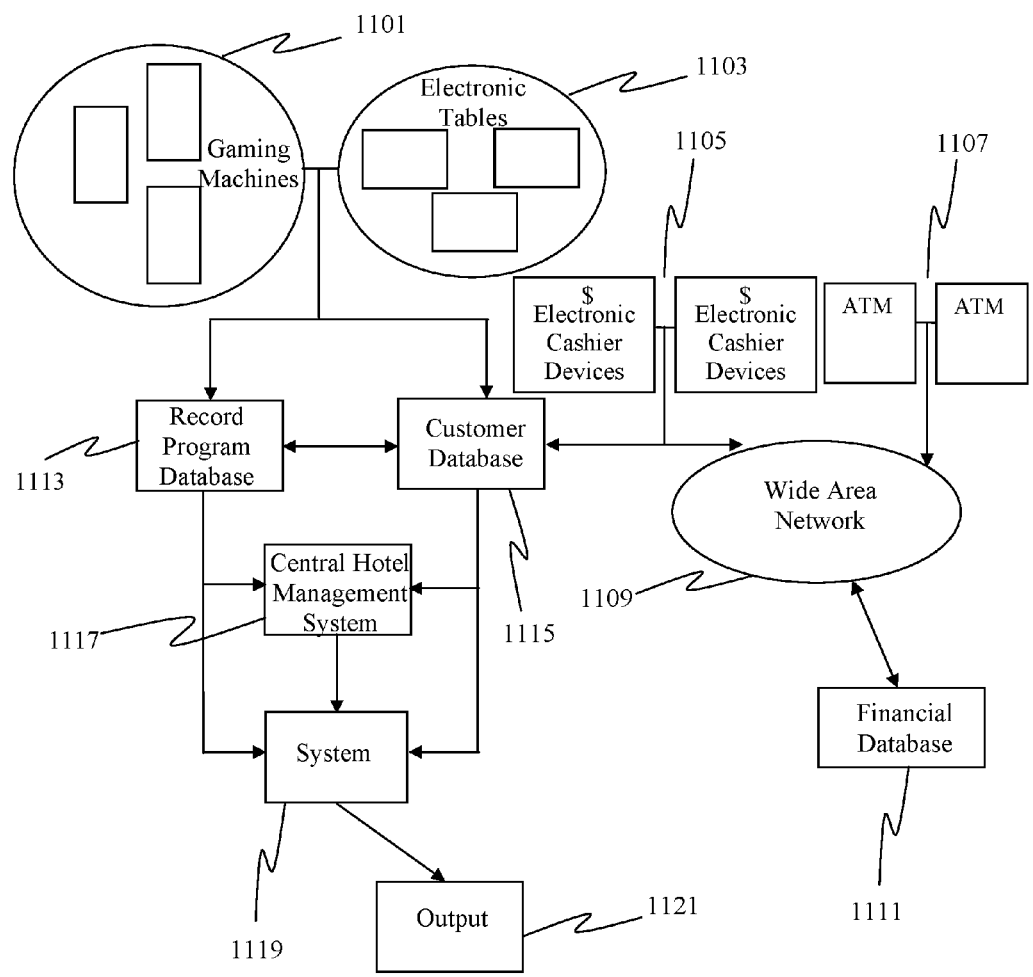
FIG. 3 shows a system block diagram of a gaming environment according to an embodiment of the present invention.

FIG. 3 shows an example of how the herein described system may be incorporated within a gaming environment. The gaming environment consists of a number of gaming machines 1101 and electronic tables 1103 (among other electronic gaming devices) that are adapted to communicate electronically with other systems using any suitable protocols, such as data packet protocols.

The gaming environment further includes a number of electronic cashier devices 1105 and ATMs 1107 which are in communication via a Wide Area Network 1109 with one or more financial databases 1111.

Data from the gaming machines 1101 and electronic tables 1103 are transferred to a reward program database 1113 and customer database 1115. It will be understood that these two databases may be combined into a single database.

Data from the cashier devices are also transferred to the reward program database 1113 and customer database 1115. The databases 1113 and 1115 are in communication with a central hotel management system 1117 that oversees the operation of the gaming environment, including the activities of customers in other areas of a casino, such as shops, hotels, spas etc.

The system 1119 described herein is in communication with the reward program database 1113, customer database 1115 and central hotel management system 1117 so the system can retrieve all necessary data about the activities within the gaming environment. The various embodiments as described herein are employed by the system 1119 to provide an output 1121.

FIG. 4 shows a further example of a set of tabulated results produced using the above described methods. The basic four quadrants are shown indicating high lift, low lift, above expected and below expected values. Each of these four quadrants is broken down into a 4×4 cell arrangement in which individual spatial elements (e.g. gaming machines) are placed using, in this example, an 'X' or cross. It will be understood that the spatial elements may also be defined by an identification number or symbol rather than a 'X'. The relative location of each element in the cell identifies whether that element is a Leader, Laggard, Loner or Loser as defined above as well as providing a finer definition within each of the broader definitions based on the location within the 16 cells within each quadrant.

The herein described methods effectively provide a type of quartal analysis where the analysis focuses on each of the herein described methods (gravity modeling, spatial association rules, fuzzy rules) separately. That is, quartal analysis involves arranging variables associated with the different analyses in n dimensions, where the data points represent n or more variables associated with the analyses. The quartal method then ranks a set of data points with respect to a first axis using a first variable; and based on a second variable, distributes the set of data points along the first axis while retaining information relating to the ranking of data points determined in the ranking stage. This becomes particularly useful where the data points are ranked with respect to one or more further axes using one or more variables; and then data points are distributed along the further axes while retaining information relating to the ranking of the data points for those further axes.

Therefore, the method described herein analyses and represents spatial data sets in order to optimize the arrangement of spatial elements which the data sets relate to. Data from the data sets is first retrieved from a data storage module. Lift values are then determined for a number of predefined spatial areas. That is, interaction relationships between spatial elements in various spatial areas are determined using fuzzy association rules.

Also, spatial performance values for the predefined spatial areas are also determined. That is, the performance values of the spatial elements within each of the spatial areas are monitored and recorded.

The lift values and spatial performance values are then combined in order to show or visualise the relationship between each of the spatial elements in a tabulated form.

It will be understood that the methods may equally be applied to a social networking environment. Further, it will be understood that the relative distance measurements may be a graph distance.

Further Embodiments

It will be understood that the embodiments of the present invention described herein are by way of example only, and that various changes and modifications may be made without departing from the scope of invention.

The invention claimed is:

1. In a data visualization system, executable on an electronic computing device, a method of analyzing and representing spatial data sets to optimize the arrangement of spatial elements which the data sets relate to, the representation enabling a user to visualize the spatial data sets in a manner that conveys information that would otherwise be lost, the method including the steps of:
   retrieving data associated with the data sets from a data storage module that is in communication with the data visualization system;
   applying a genetic algorithm to the retrieved data to form a spatial design;
   determining lift values for a plurality of predefined spatial areas within the spatial design based on a set of fuzzy association rules applied to the predefined spatial areas;
   determining spatial performance values for the predefined spatial areas;
   combining the determined lift values and spatial performance values to show the relationship between each of the spatial elements within the predefined spatial areas; and
   displaying on a display device a graphical representation showing the spatial areas.

2. The method of claim 1 wherein the fuzzy association rules apply spatial data within the retrieved data to a set of association rules to determine lift values for the predefined spatial areas.

3. The method of claim 1 further including the steps of monitoring the retrieved data over time and predicting changes to the weighted spatial relationships based on changes in the retrieved data.

4. The method of claim 1 further including the steps of determining isolated spatial areas and calculating weighted spatial relationships within the isolated spatial area.

5. The method of claim 1 further including the steps of cross tabulating the determined lift values and spatial performance values to show the relationship between each of the spatial elements within the predefined spatial areas.

6. A data visualization system arranged to perform the method according to claim 1.

7. The data visualization system of claim 6 wherein the fuzzy association rules apply spatial data within the retrieved data to a set of association rules to determine lift values for the predefined spatial areas.

8. The data visualization system of claim 6 further arranged to perform the steps of monitoring the retrieved data over time and predicting changes to the weighted spatial relationships based on changes in the retrieved data.

9. The data visualization system of claim 6 further arranged to perform the steps of determining isolated spatial areas and calculating weighted spatial relationships within the isolated spatial area.

10. The data visualization system of claim 6 further arranged to perform the steps of cross tabulating the determined lift values and spatial performance values to show the relationship between each of the spatial elements within the predefined spatial areas.

* * * * *